United States Patent
Miura et al.

(10) Patent No.: US 6,947,426 B2
(45) Date of Patent: Sep. 20, 2005

(54) COMMUNICATION CONTROL SYSTEM

(75) Inventors: Kazue Miura, Aichiken (JP); Hiroki Yaguchi, Aichiken (JP)

(73) Assignee: Matsushita Electric Industrial Co., Ltd., Osaka-Fu (JP)

( * ) Notice: Subject to any disclaimer, the term of this patent is extended or adjusted under 35 U.S.C. 154(b) by 822 days.

(21) Appl. No.: 09/938,737

(22) Filed: Aug. 27, 2001

(65) Prior Publication Data

US 2002/0024976 A1 Feb. 28, 2002

(30) Foreign Application Priority Data

Aug. 28, 2000 (JP) ........................................ 2000-257048

(51) Int. Cl.$^7$ ............................................. H04L 12/28
(52) U.S. Cl. ................................... 370/395.4; 370/429
(58) Field of Search ........................... 370/395.1, 395.4, 370/395.42, 395.43, 395.7, 395.71, 412, 413, 415, 417, 428, 429

(56) References Cited

U.S. PATENT DOCUMENTS

| | | | | |
|---|---|---|---|---|
| 5,537,400 A | * | 7/1996 | Diaz et al. | 370/412 |
| 5,742,600 A | | 4/1998 | Nishihara | |
| 5,963,564 A | * | 10/1999 | Petersen et al. | 370/395.1 |
| 6,738,381 B1 | * | 5/2004 | Agnevik et al. | 370/395.7 |
| 2002/0159391 A1 | * | 10/2002 | Demizu | 370/395.2 |

FOREIGN PATENT DOCUMENTS

| | | |
|---|---|---|
| JP | 2561045 | 9/1996 |
| JP | 2561046 | 9/1996 |
| JP | 2569118 | 10/1996 |
| WO | WO 99/33315 | 7/1999 |

* cited by examiner

*Primary Examiner*—Duc Ho
*Assistant Examiner*—Phuongchau Ba Nguyen
(74) *Attorney, Agent, or Firm*—McDermott Will & Emery LLP

(57) ABSTRACT

The communication control system of the present invention includes a cell buffer assembly that is common to a plurality of input ports and stores cells. A writing controller and a reading controller respectively control a process of writing a cell into the cell buffer assembly and a process of reading a cell from the cell buffer assembly. A writing time management memory maps a writing time of each cell to each area in the cell buffer assembly and manages the mapping. A cell discard controller discards a cell having a long elapsed time since the writing time stored in the writing time management memory by the processing, which is independent of the processing by the writing controller and the reading controller. The arrangement of discarding the oldest cell independently of the writing and reading operations enables efficient discard of cells, while ensuring a desired communication rate. This arrangement simplifies the cell discard control and enhances its efficiency in the case of convergence in multiplex communication in the form of fixed-length cells.

5 Claims, 18 Drawing Sheets

Fig. 6 WRITING TIME MANAGEMENT MEMORY

Fig.9

| | | Initial | S14 | S16 | S20 |
|---|---|---|---|---|---|
| 1ST Class Management Buffer | Head cell buffer No. | 1 | 1 | 1 | 1 |
| | Last cell buffer No. | 1 | 1 | 1 | 3 |
| 1ST Cell Buffer | Time management buffer No. | 1 | 1 | 1 | 1 |
| | Cell data | AAA | AAA | AAA | AAA |
| | Subsequent cell buffer No. | 1 | 1 | 1 | 3 |
| 2ND Cell Buffer | Time management buffer No. | | | | |
| | Cell data | | | | |
| | Subsequent cell buffer No. | | | | |
| 3rd Cell Buffer | Time management buffer No. | | | 2 | 2 |
| | Cell data | | | BBB | BBB |
| | Subsequent cell buffer No. | | | 3 | 3 |
| 4th Cell Buffer | Time management buffer No. | | | | |
| | Cell data | | | | |
| | Subsequent cell buffer No. | | | | |
| Vacant Buffer Management Memory | 1ST management buffer | 3 | | | |
| | 2ND management buffer | 4 | 4 | 4 | 4 |
| | 3rd management buffer | 2 | 2 | 2 | 2 |
| | 4th management buffer | | | | |
| 1ST Time Management Buffer | Buffer[1] Enable flag | 1 | 1 | 1 | 1 |
| | Buffer[1] Time stamp | aa:aa | aa:aa | aa:aa | aa:aa |
| | Buffer[1] Class information | 1 | 1 | 1 | 1 |
| | Buffer[2] Enable flag | 0 | 1 | 1 | 1 |
| | Buffer[2] Time stamp | | bb:bb | bb:bb | bb:bb |
| | Buffer[2] Class information | | 1 | 1 | 1 |
| | Buffer[3] Enable flag | 0 | 0 | 0 | 0 |
| | Buffer[3] Time stamp | | | | |
| | Buffer[3] Class information | | | | |
| | Buffer[4] Enable flag | 0 | 0 | 0 | 0 |
| | Buffer[4] Time stamp | | | | |
| | Buffer[4] Class information | | | | |

Fig.12

| | | Initial | S32 | S34 | S36 | S38 |
|---|---|---|---|---|---|---|
| 1ST Class Management Buffer | Head cell buffer No. | 1 | 1 | 1 | 1 | 3 |
| | Last cell buffer No. | 3 | 3 | 3 | 3 | 3 |
| 1ST Cell Buffer | Time management buffer No. | 1 | | | | |
| | Cell data | AAA | | | | |
| | Subsequent cell buffer No. | 3 | | | | |
| 2ND Cell Buffer | Time management buffer No. | | | | | |
| | Cell data | | | | | |
| | Subsequent cell buffer No. | | | | | |
| 3rd Cell Buffer | Time management buffer No. | 2 | 2 | 2 | 2 | 2 |
| | Cell data | BBB | BBB | BBB | BBB | BBB |
| | Subsequent cell buffer No. | 3 | 3 | 3 | 3 | 3 |
| 4th Cell Buffer | Time management buffer No. | | | | | |
| | Cell data | | | | | |
| | Subsequent cell buffer No. | | | | | |
| Vacant Buffer Management Memory | 1ST management buffer | | | | | |
| | 2ND management buffer | 4 | 4 | 4 | 4 | 4 |
| | 3rd management buffer | 2 | 2 | 2 | 2 | 2 |
| | 4th management buffer | | | 1 | 1 | 1 |
| 1ST Time Management Buffer | Buffer[1] Enable flag | 1 | 1 | 1 | 0 | 0 |
| | Buffer[1] Time stamp | aa:aa | aa:aa | aa:aa | | |
| | Buffer[1] Class information | 1 | 1 | 1 | | |
| | Buffer[2] Enable flag | 1 | 1 | 1 | 1 | 1 |
| | Buffer[2] Time stamp | bb:bb | bb:bb | bb:bb | bb:bb | bb:bb |
| | Buffer[2] Class information | 1 | 1 | 1 | 1 | 1 |
| | Buffer[3] Enable flag | 0 | 0 | 0 | 0 | 0 |
| | Buffer[3] Time stamp | | | | | |
| | Buffer[3] Class information | | | | | |
| | Buffer[4] Enable flag | 0 | 0 | 0 | 0 | 0 |
| | Buffer[4] Time stamp | | | | | |
| | Buffer[4] Class information | | | | | |

Fig.15

| | | Initial | S56 | S58 | S60 | S62 |
|---|---|---|---|---|---|---|
| 1ST Class Management Buffer | Head cell buffer No. | 1 | 1 | 1 | 1 | 3 |
| | Last cell buffer No. | 3 | 3 | 3 | 3 | 3 |
| 1ST Cell Buffer | Time management buffer No. | 1 | 1 | 1 | 1 | |
| | Cell data | AAA | AAA | AAA | AAA | |
| | Subsequent cell buffer No. | 3 | 3 | 3 | 3 | |
| 2ND Cell Buffer | Time management buffer No. | | | | | |
| | Cell data | | | | | |
| | Subsequent cell buffer No. | | | | | |
| 3rd Cell Buffer | Time management buffer No. | 2 | 2 | 2 | 2 | 2 |
| | Cell data | BBB | BBB | BBB | BBB | BBB |
| | Subsequent cell buffer No. | 3 | 3 | 3 | 3 | 3 |
| 4th Cell Buffer | Time management buffer No. | | | | | |
| | Cell data | | | | | |
| | Subsequent cell buffer No. | | | | | |
| Vacant Buffer Management Memory | 1ST management buffer | | | | | |
| | 2ND management buffer | 4 | 4 | 4 | 4 | 4 |
| | 3rd management buffer | 2 | 2 | 2 | 2 | 2 |
| | 4th management buffer | | | 1 | 1 | 1 |
| 1ST Time Management Buffer | Buffer[1] Enable flag | 1 | 1 | 1 | 0 | 0 |
| | Buffer[1] Time stamp | aa:aa | aa:aa | aa:aa | | |
| | Buffer[1] Class information | 1 | 1 | 1 | | |
| | Buffer[2] Enable flag | 1 | 1 | 1 | 1 | 1 |
| | Buffer[2] Time stamp | bb:bb | bb:bb | bb:bb | bb:bb | bb:bb |
| | Buffer[2] Class information | 1 | 1 | 1 | 1 | 1 |
| | Buffer[3] Enable flag | 0 | 0 | 0 | 0 | 0 |
| | Buffer[3] Time stamp | | | | | |
| | Buffer[3] Class information | | | | | |
| | Buffer[4] Enable flag | 0 | 0 | 0 | 0 | 0 |
| | Buffer[4] Time stamp | | | | | |
| | Buffer[4] Class information | | | | | |

COMMUNICATION CONTROL SYSTEM

BACKGROUND OF THE INVENTION

1. Field of the Invention

The present invention relates to a communication control technique that controls multiplex communication in the form of fixed-length cells. More specifically the present invention pertains to a buffer management technique to manage cells stored in a cell buffer assembly.

2. Description of the Related Art

A known technique of high-speed transfer of large-capacity data, such as movie data, is asynchronous transfer mode (ATM). ATM time division data, for example, voice data, static image data, or movie data, into fixed-length, 53-byte cells and carries out communication in the form of such cells. Transmission of the time-divided cells enables signals from a plurality of input ports to be multiplexed. The cells are temporarily stored in a buffer included in a communication controller or a multiplexer, and are read from the buffer at a desired rate or at desired time intervals set for each communication.

There is a known technique for sharing the buffer among all the input ports. This method manages the place and the order of storage of cells at each input port and shares the storage area for cells.

FIG. 18 illustrates the configuration of a prior art communication control system. Cells input via 'n' input ports are stored in a common cell buffer 3, which is shared among all the input ports, under the control of a writing controller 1. A vacant buffer management memory 4 manages writable areas in the cell buffer 3. The writing controller 1 writes a cell in a vacant area specified by the vacant buffer management memory 4 and transmits information on a storage place of the cell to a class management memory 2. The class management memory 2 manages the place and the order of storage of cells at each input port.

A reading controller 6 reads cells from the cell buffer 3, multiplexes the cells, and outputs the multiplexed cells to the ATM network. The reading controller 6 refers to the class management memory 2 and specifies the order of reading the cells at each input port. The reading controller 6 reads and outputs the cells at each input port, which have been time-divided at a preset rate, in the specified order. The read-out area is specified as a vacant area and becomes subject to management by the vacant buffer management memory 4. The writing and reading operations are based on the time counted by a clock 5, in order to ensure the preset communication rate.

This prior art communication control technique does not require an individual cell buffer for each input port, thus desirably reducing the total capacity of the cell buffer. An increase in number of areas in the class management memory readily extends input ports without requiring any additional buffer.

In ATM, a minimum cell rate (MCR) is set for each input port. The transfer rate exceeding the MCR is allowed in the state of low traffic. Under the convergence of traffic, cells are discarded to ensure the MCRs of the other input ports. The prior art technique discards cells, based on the occupation rate of the storage area in the cell buffer. When the occupation rate in the cell buffer exceeds a preset threshold value under the convergence of traffic, cells stored at the transfer rate exceeding the MCR, that is, non-priority cells, are discarded.

On the management of the storage places of cells in the cell buffer, the prior art system carries out discard of non-priority cells as part of the cell reading control. Namely the reading controller discards a non-priority cell without transmission in the course of reading the cell from the cell buffer. The prior art system requires relatively complicated control procedures, since the reading controller performs the two different control processes, that is, the cell reading control and the cell discard control. This prior art technique reads the non-priority cell, irrespective of non-execution of transmission. This lengthens the total processing time. Discard of the non-priority cell is carried out on completion of the process of reading a normal cell to be transmitted. This lowers the efficiency of processing.

SUMMARY OF THE INVENTION

The object of the present invention is to simplify cell discard control to discard cells from a cell buffer assembly and enhance the efficiency of the cell discard control in multiplex communication in the form of fixed-length cells.

At least part of the above and the other related objects is attained by a communication control system that controls multiplex communication in the form of fixed-length cells. The communication control system includes: a common cell buffer assembly that stores therein cells of the multiplex communication; and a buffer management unit that controls a process of reading a cell from the cell buffer assembly and a process of writing a cell into the cell buffer assembly, thus controlling communication between a large number of input-output ports and a multiplex communication network. The buffer management unit has a cell discard controller that discards a cell stored in the cell buffer assembly when a time period of not shorter than a preset discard reference time has elapsed since storage of the cell into the cell buffer assembly. The technique of the present invention is applicable to diverse multiplex communication in the form of fixed-length cells, for example, ATM (asynchronous transfer mode).

In the communication control system of the present invention, the cell discard controller is provided to carry out the cell discard control, independently of the cell writing control and the cell reading control. This arrangement simplifies the control procedure in the buffer management unit, while ensuring flexible adjustment of the execution timing of the cell discard control.

Discard of a cell is based on the elapsed time period since storage of the cell. Namely the oldest cell has the first priority of discard. The 'preset discard reference time' represents a reference time period of the cell discard operation and is adequately set for each communication. This arrangement enables cells to be readily discarded, while keeping a required MCR of each communication.

The elapsed time period may be an elapsed time since storage of the cell, the number of steps in the control process after storage of the cell, or the number of cycles of the cell discard control process. The cell discard operation based on the elapsed time may be actualized by the structure using a writing time management unit that maps each cell to a writing time of the cell and manages the mapping. Such application based on the elapsed time readily ensures the desired MCR.

In the structure that discards the cell based on the elapsed time, it is preferable that the writing time management unit includes a writing time buffer and a related information storage unit. The writing time buffer stores a writing time of each cell in time series. The related information storage unit stores related information, which relates data stored in the cell buffer assembly to data stored in the writing time buffer. Simple retrieval of the writing time buffer readily identifies the cell having a long elapsed time. This arrangement enhances the efficiency of the cell discard control.

The related information storage unit may be provided as a separate memory area from the cell buffer assembly and the writing time buffer. In this case, it is required to map the storage area in the cell buffer assembly to the storage area in the writing time buffer. The related information storage unit may be provided inside the cell buffer assembly or the writing time buffer. In the former case, for example, the storage area in the writing time buffer may be mapped to each cell stored in the cell buffer assembly. This reduces the required storage capacity of the related information storage unit.

Multiplex communication may include a plurality of different quality classes of communication, which are classified by a desired transfer rate or bandwidth and other transfer parameters like the allowable range of an error rate. In accordance with one preferable application of the present invention, the discard reference time is set for each quality class, and the buffer management unit controls the communication according to the quality class. This arrangement ensures the cell discard control that satisfies requirements of each quality class.

A diversity of structures may be applied to manage the cell writing and reading operations utilizing the common cell buffer assembly. In one preferable embodiment, the buffer management unit includes a vacant buffer management unit, a cell management unit, a writing controller, and a reading controller. The vacant buffer management unit manages vacant areas in the cell buffer assembly. The cell management unit stores management information to manage places of storage of a series of cells, which constitute each communication. The writing controller writes a new cell in a vacant area specified by the vacant buffer management unit and transmits a result of the writing to the cell management unit. The reading controller reads a cell from the cell buffer assembly, based on the management information in the cell management unit and transmits a result of the reading to the vacant buffer management unit.

When the buffer management unit has the above structure, it is preferable that the cell discard controller deletes information on a place of storage of the cell to be discarded from the cell management unit, and transmits the place of storage as a new vacant area to the vacant buffer management unit, thereby implementing discard of the cell. In this application, simple update of the management information attains discard of cells without reading a discard cell from the cell buffer assembly. This arrangement desirably speeds up the cell discard control.

The technique of the present invention may be actualized by a buffer management system that manages a cell buffer assembly used in communication, in addition to the communication control system discussed above. The present invention is also directed to a communication control method and a buffer management method. Other possible applications of the present invention include programs for actualizing communication control and buffer management, a diversity of equivalent signal systems, and recording media in which the programs are recorded in a computer readable manner.

Typical examples of the recording media include flexible disks, CD-ROMs, magneto-optic discs, IC cards, ROM cartridges, punched cards, prints with barcodes or other codes printed thereon, internal storage devices (memories like a RAM and a ROM) and external storage devices of the computer, and a variety of other computer readable media.

BRIEF DESCRIPTION OF THE DRAWINGS

FIG. 9 shows a variation in data of the respective buffers in the course of the writing control process;

FIG. 12 shows a variation in data of the respective buffers in the course of the reading control process;

FIG. 15 shows a variation in data of the respective buffers in the course of the cell discard control process;

DESCRIPTION OF THE PREFERRED EMBODIMENT

Figure 1:
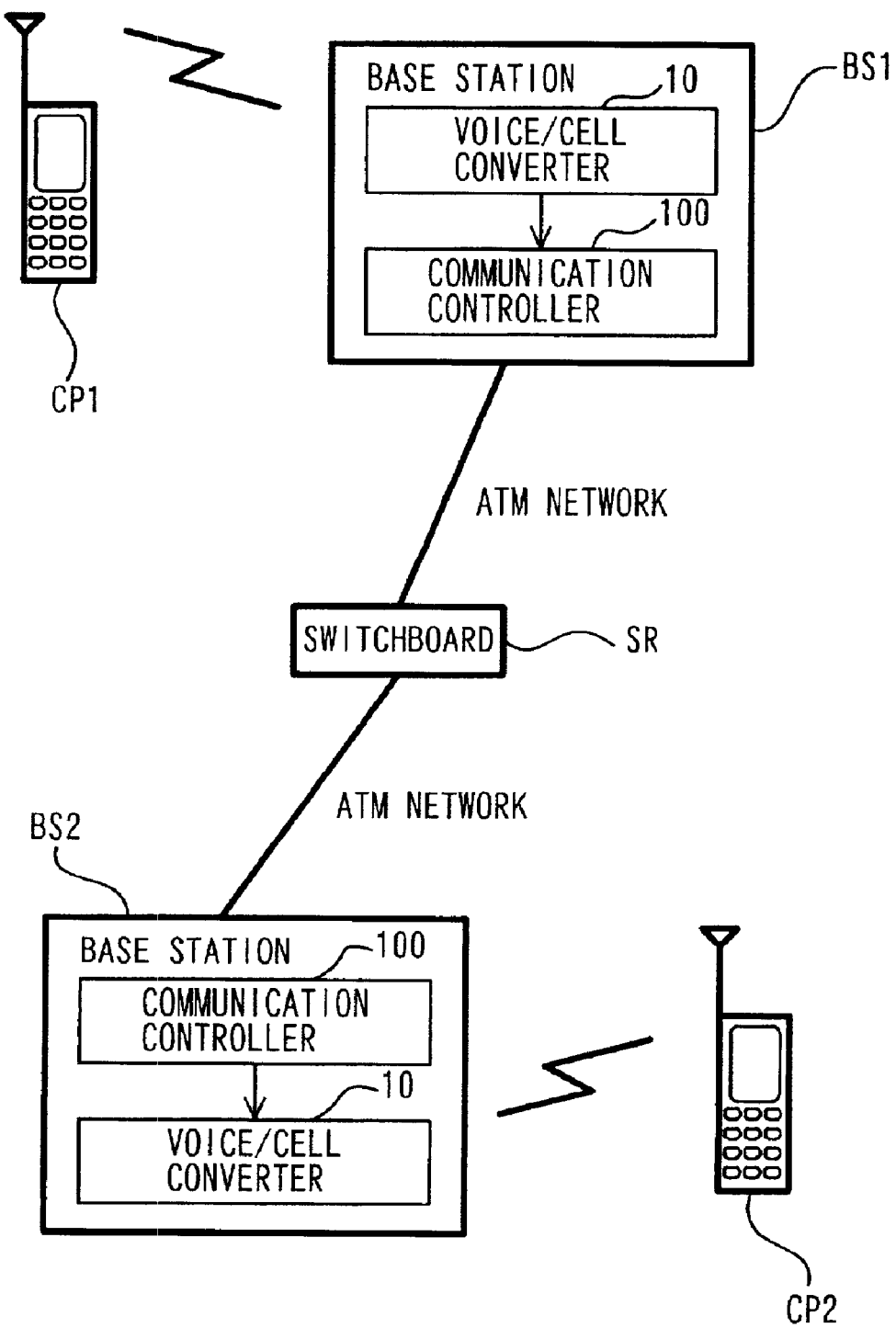
FIG. 1 schematically illustrates the configuration of a communication system in one embodiment of the present invention.

A mode of carrying out the present invention is discussed below as one embodiment in the following sequence:
A. Configuration of System
B. Communication Control Process
  B1. Writing Control Process
  B2. Reading Control Process
  B3. Cell Discard Control Process
  B4. Modification of Cell Discard Control Process
A. Configuration of System FIG. 1 schematically illustrates the configuration of a communication system in one embodiment of the present invention. The illustration regards the configuration in the case of voice communication between cellular phones CP1 and CP2. Audio signals input into the cellular phone CP1 are transmitted to a base station BS1 by wireless. The base station BS1 is capable of simultaneously communicating with a plurality of cellular phones. Each cellular phone is mapped to each input port on the base station BS1 for communication.

The base station BS1 has a voice/cell converter 10 and a communication controller 100. The voice/cell converter 10 converts the audio signals received from the cellular phone CP1 to fixed-length cells. This embodiment uses the cells each having 48 byte payload and 5 byte header.

The communication controller 100 transmits the cells to an ATM network. The communication controller 100 outputs the cells to the ATM network by the technique of time division to maintain a fixed rate at each input port.

A plurality of base stations are connected to the ATM network via a switchboard SR. The switchboard SR carries out routing in the ATM network corresponding to a designated destination and transfers the cells to a receiver base station BS2. Like the base station BS1, the receiver base station BS2 has a communication controller 100 and a voice/cell converter 10. The communication controller 100 classifies the cells received from the ATM network by the output port. The cells are converted to audio signals by the voice/cell converter 100 and are transmitted by wireless to the cellular phone CPU2, which is mapped to one output port.

The embodiment mainly discusses the structure of the communication controller 100 and the control procedure in the communication system of the above configuration. The following description regards voice communication as an example. The terminals connected to each base station are not restricted to the cellular phones. In another application, a plurality of computers are connected to the base station to enable mutual communication of diverse digital data, such as dynamic images, static images, and text data. The target data for communication are not restricted to one type but may be a mixture of different types.

Figure 2:
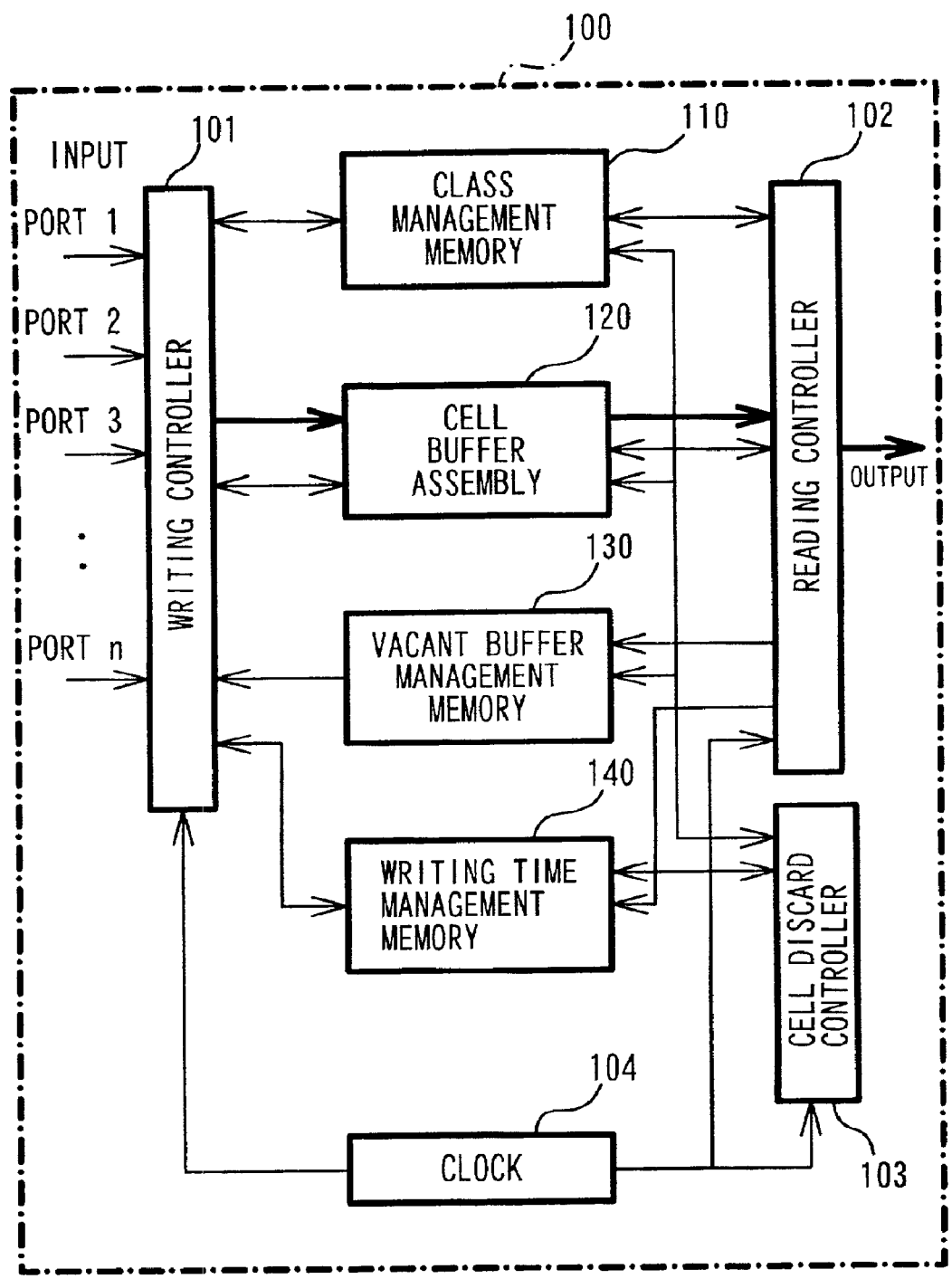
FIG. 2 illustrates the structure of a communication controller 100.
Figure 18:
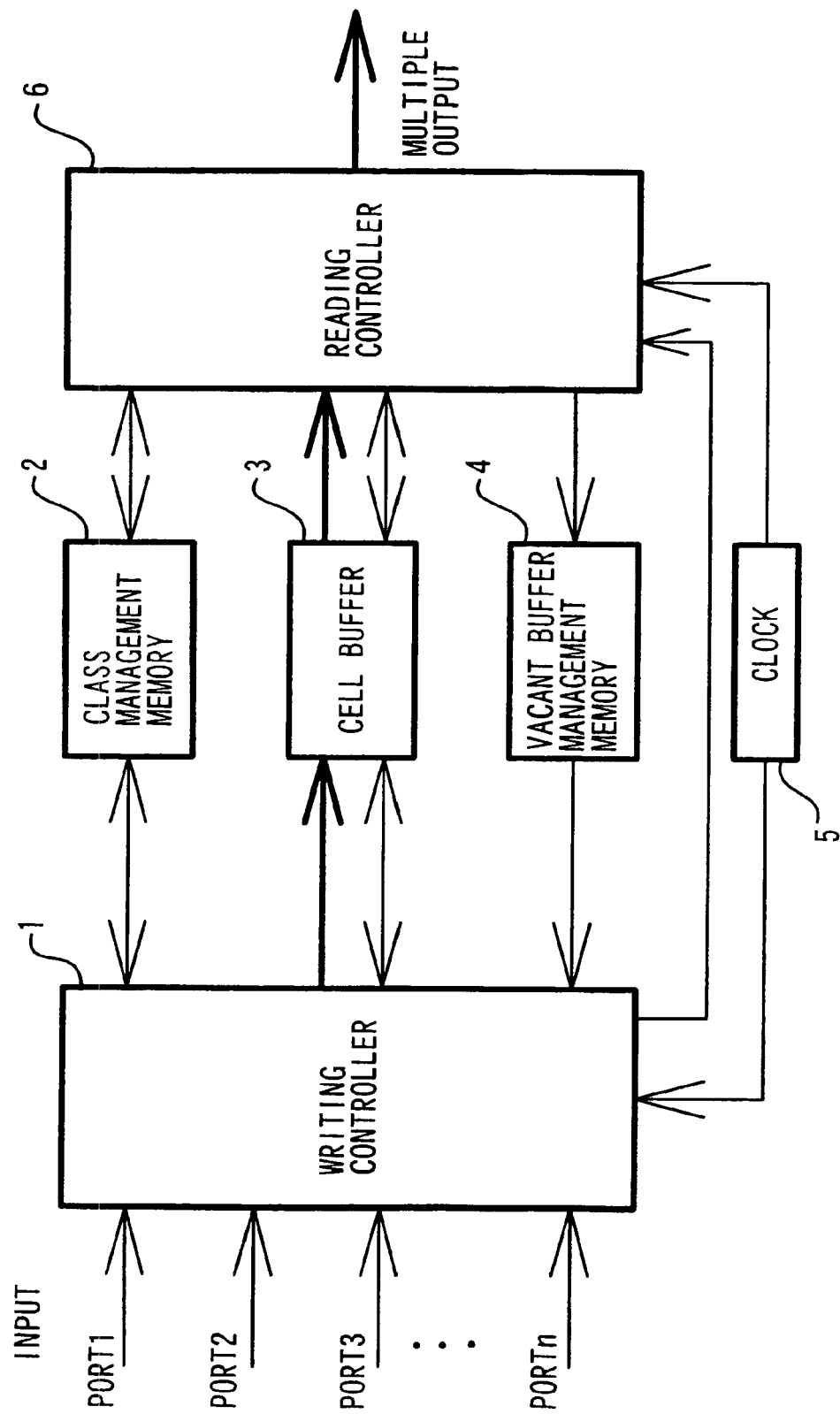
FIG. 18 illustrates the configuration of prior art communication control.

FIG. 2 illustrates the structure of the communication controller 100. The difference from the prior art communication controller (see FIG. 18) is the presence of a writing time management memory 140 and a cell discard controller 103.

The communication controller 100 is constructed as a computer including a CPU, various memories, and other related units. A writing controller 101, a reading controller 102, and the cell discard controller 103 are actualized by software. A class management memory 110, a cell buffer assembly 120, a vacant buffer management memory 130, and the writing time management memory 140 are actualized by specific areas set on a RAM and the software required for management of these areas. A clock 104 is a counter that counts the clock used to synchronize the operations of the computer.

Figure 3:
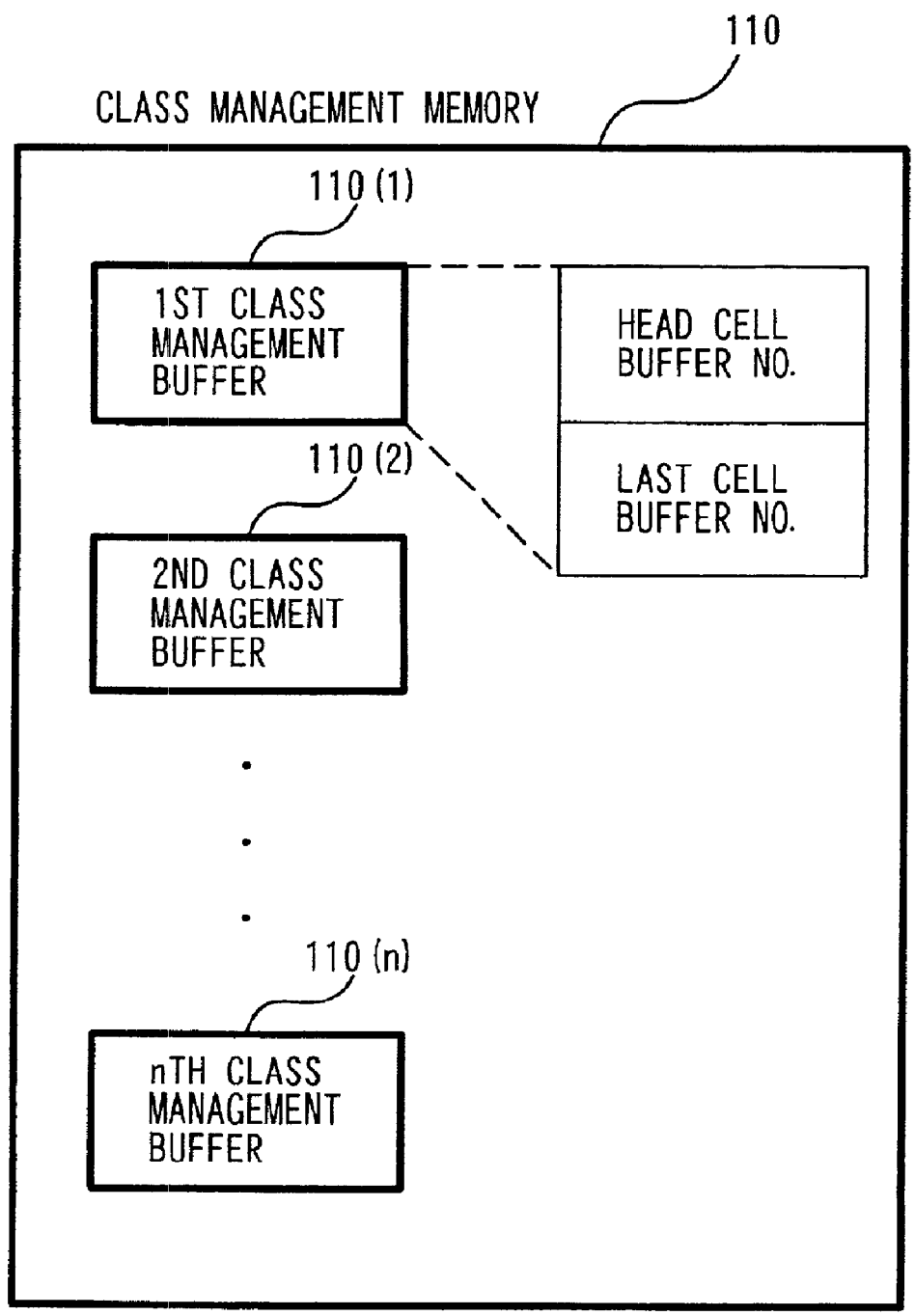
FIG. 3 shows the internal structure of a class management memory 110.

FIG. 3 shows the internal structure of the class management memory 110. The class management memory 110 is divided into 'n' areas, a first class management buffer 110(1) to an n-th class management buffer 110(n), which are respectively mapped to 'n' input ports connecting with the communication controller 100. Each class management buffer is unequivocally mapped to one input port, and keeps two data, that is, a head cell buffer number and a last cell buffer number. The head cell buffer number represents data for specifying the position of a head cell stored in the cell buffer assembly 120, among a group of cells input from each input port. The last cell buffer number represents data for specifying the position of a last cell stored in the cell buffer assembly 120.

Figure 4:
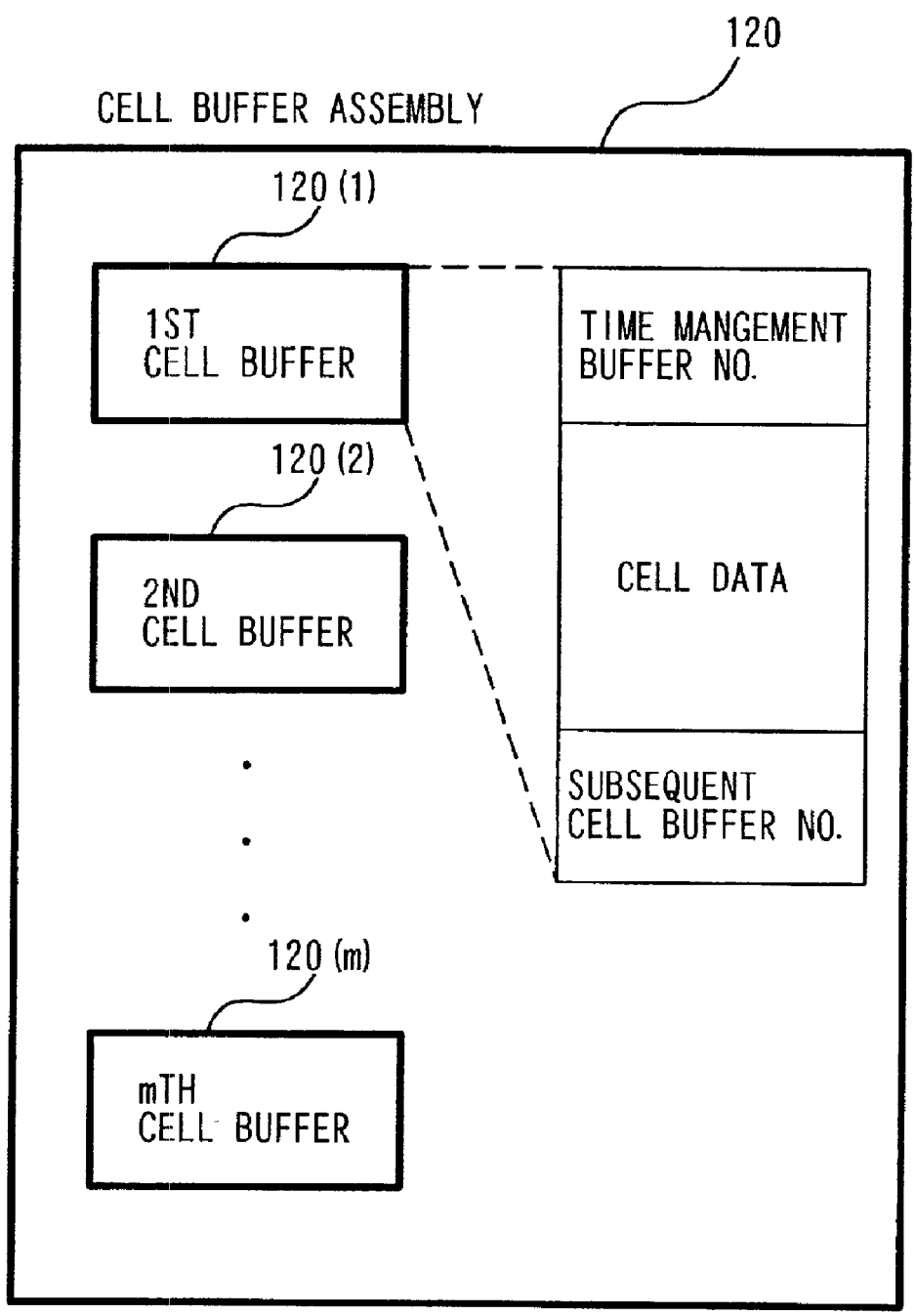
FIG. 4 shows the internal structure of a cell buffer assembly 120.

FIG. 4 shows the internal structure of the cell buffer assembly 120. The cell buffer assembly 120 is divided into 'm' areas, that is, a first cell buffer 120(1) to an m-th cell buffer 120(m). The number of cell buffers 'm' corresponds to the maximum number of cells that can be stored simultaneously in the cell buffer assembly 120. The number of cell buffers 'm' is specified adequately according to the number of input ports 'n' connecting with the communication controller 100 and the communication rate to be assured at each input port.

In this embodiment, the position of each cell stored in the cell buffer assembly 120 is identified by the buffer number from 1 to 'm'. A unique address is allocated to each storage area in the cell buffer assembly 120, so that the storage area may be identified directly with this address.

Each of the first to the m-th cell buffers stores therein a set of three data, a time management buffer number, cell data, and a subsequent cell buffer number. The cell data represents a 53-byte cell to be communicated. The subsequent cell buffer number is used to specify a next cell buffer to be read out next. The control refers to the subsequent cell buffer number every time reading out a cell, thus sequentially reading out a group of cells. The time management buffer number will be discussed later.

Figure 5:
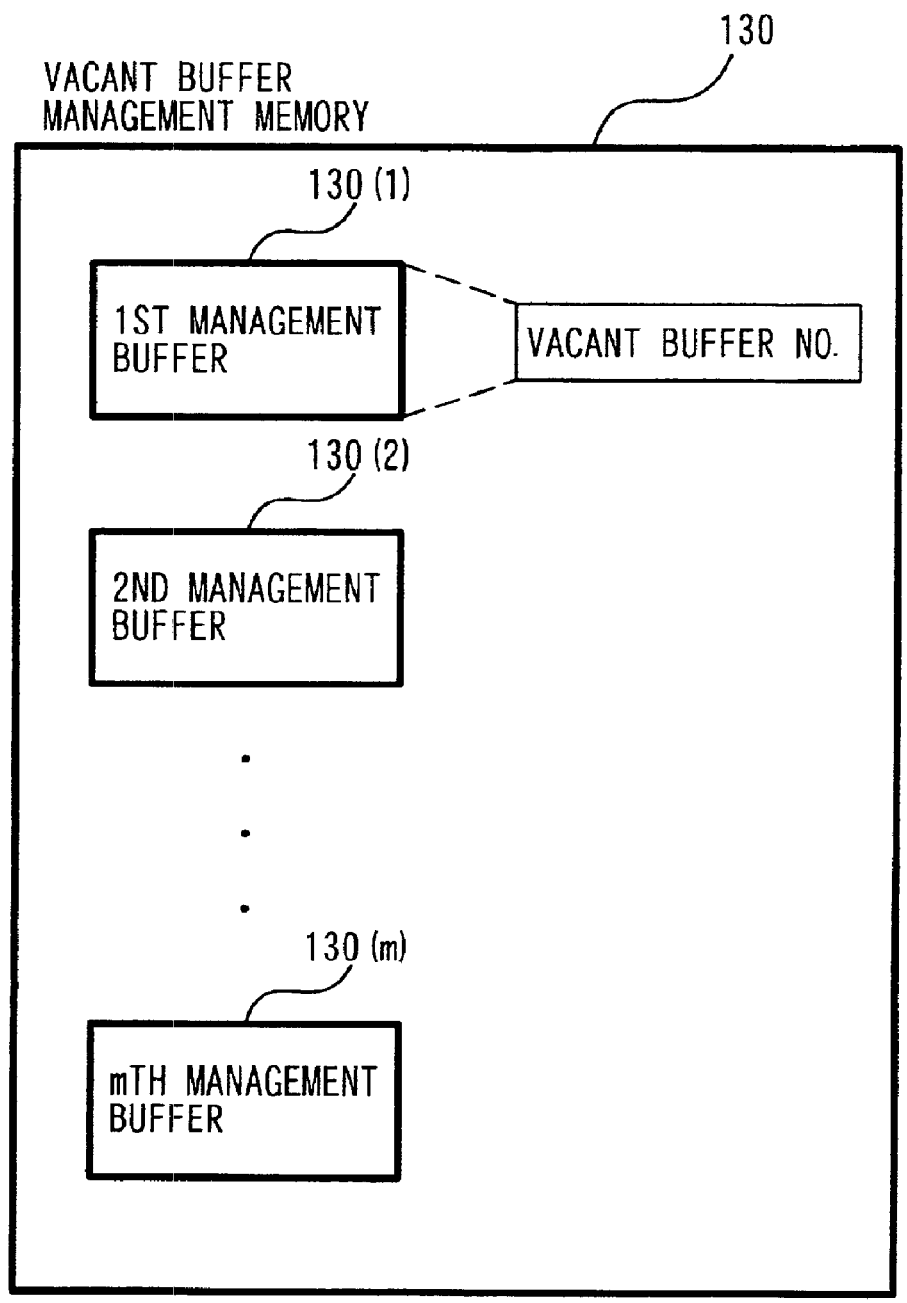
FIG. 5 shows the internal structure of a vacant buffer management memory 130.

FIG. 5 shows the internal structure of the vacant buffer management memory 130. The vacant buffer management memory 130 is divided into 'm' areas, that is, a first management buffer 130(1) to an m-th management buffer 130(m), which correspond to the buffers 'm' included in the cell buffer assembly 120. Each management buffer stores therein a vacant buffer number, which is used to specify a vacant area in the cell buffer assembly 120. The buffer number in the vacant buffer management memory 130 is not unequivocally allocated to the buffer number in the cell buffer assembly 120. For example, two to 'm' values may be stored as vacant buffer numbers in the first management buffer 130(1).

In this embodiment, the vacant buffer management memory 130 has the 'm' areas by considering the possibility that all the areas in the cell buffer assembly 120 are vacant. The number of areas in the vacant buffer management memory 130 is specified according to the maximum possible number of vacant areas in the cell buffer assembly 120. The number of areas in the vacant buffer management memory 130 may thus be different from the number of buffers 'm' in the cell buffer assembly 120.

The purpose of specifying the vacant buffer in the cell buffer assembly 120 may be attained by substituting an 'm'-bit flag for the vacant buffer management memory 130. In this case, the respective digits of the 'm' bits are unequivocally mapped to the first cell buffer 120(1) to the m-th cell buffer 120(m), and the number '0' or '1' is allocated to each digit to represent vacancy or occupation. In this structure, however, it is required to retrieve the 'm'-bit flag and find a vacant area in the cell buffer assembly 120 every time a cell is stored. The structure shown in FIG. 5, on the other hand, advantageously ensures specification of the vacant buffer number without such retrieval by sequentially referring to the first management buffer 130(1) to the m-th management buffer 130(m).

Figure 6:
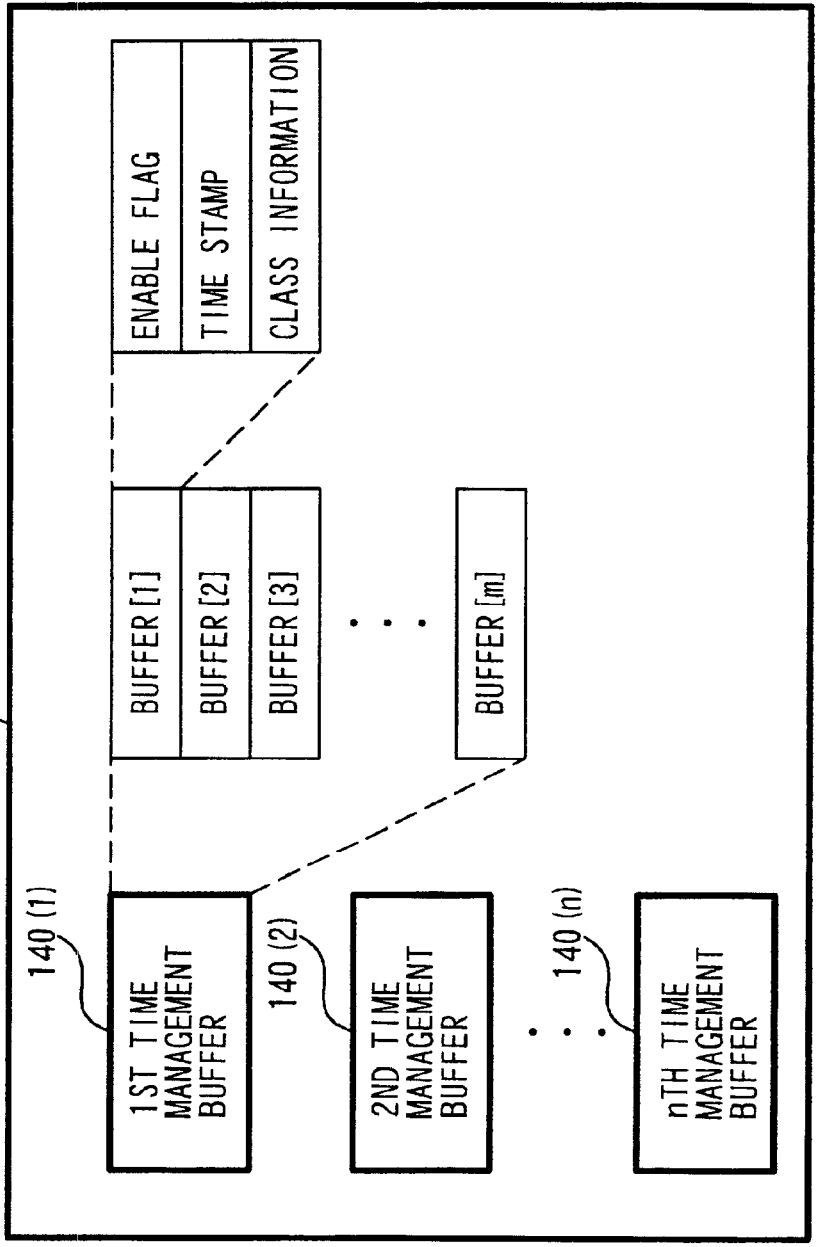
FIG. 6 shows the internal structure of a writing time management memory 140.

FIG. 6 shows the internal structure of the writing time management memory 140. The writing time management memory 140 is divided into 'n' areas, that is, a first time management buffer 140(1) to an n-th time management buffer 140(n), which correspond to the input ports 'n'. These areas are unequivocally mapped to the 'n' input ports. Each time management buffer is divided into 'm' buffers, buffers [1] to [m], which correspond to the buffers 'm' included in the cell buffer assembly 120. Each buffer stores therein three data, that is, an enable flag, a time stamp, and class information. The enable flag represents the validity of the time stamp stored in the buffer. The setting of '1' to the flag represents the valid state, while the setting of '0' to the flag represents the invalid state.

The class information is data showing the quality class of communication. The quality class represents the class of communication specified by a diversity of communication parameters, such as the communication rate and the error rate. In the case where the quality class of communication at all the input ports is restricted to one class, the storage of the quality information may be omitted. In the structure of the embodiment, the class information is stored to enable flexible discard of cells even when different input ports handle different quality classes. Each of the buffers [1] to [m] stores the class information by considering the possibility that data of different quality classes may be the target of communication via one input port.

The time stamp represents the time when a cell is written into a cell buffer of the cell buffer assembly 120, which is mapped to a buffer in the writing time management memory 140. The mapping is identified by the time management buffer number written in the cell buffer of the cell buffer assembly 120. As shown in FIG. 4, each cell buffer in the cell buffer assembly 120 stores therein the time management buffer number as well as the cell data and the subsequent cell buffer number. The time management buffer number coincides with the buffer number assigned to the buffer in the writing time management memory 140, in which the time stamp is stored. For example, a cell input via the first input port is stored in the first cell buffer 120(1), and the number '2' is stored as the time management buffer number in the first cell buffer 120(1). In this example, the time stamp of the first cell buffer 120(1) is stored in the buffer [2] of the first time management buffer 140(1), which corresponds to the first input port.

As described above, the buffer number in the writing time management memory 140 is thus not unequivocally allocated to the buffer number in the cell buffer assembly 120. The time stamp is sequentially stored into the buffers [1] to [m] in the writing time management memory 140 every time a cell is written into a cell buffer of the cell buffer assembly 120. This arrangement enables the cells written into the cell buffer assembly 120 to be readily managed in time series.

In the structure of FIG. 2, the writing controller 101, the reading controller 102, and the cell discard controller 103 occasionally utilize the class management memory 110, the cell buffer assembly 120, the vacant buffer management memory 130, and the writing time management memory 140 to actualize a diversity of communication-relating control operations discussed below.

B. Communication Control

The communication control executed by the communication controller 100 mainly includes a control process of writing a cell into the cell buffer assembly 120, a control process of reading out a cell, and a control process of discarding a cell. In the system of this embodiment, the writing control process, the reading control process, and the cell discard control process are carried out iteratively in this sequence. These three control processes are basically independent of one another, and the executing time of each process may thus be set arbitrarily. For example, one cycle of the cell discard control process may be carried out relative to a preset number of cycles of the writing control process and the reading control process. In another example, the cell discard control process may be carried out when a specified condition is fulfilled, for example, the occupation rate of the cell buffer assembly 120 exceeds a preset threshold value. These three control processes are discussed in detail below.

B1. Writing Control Process

Figure 7:
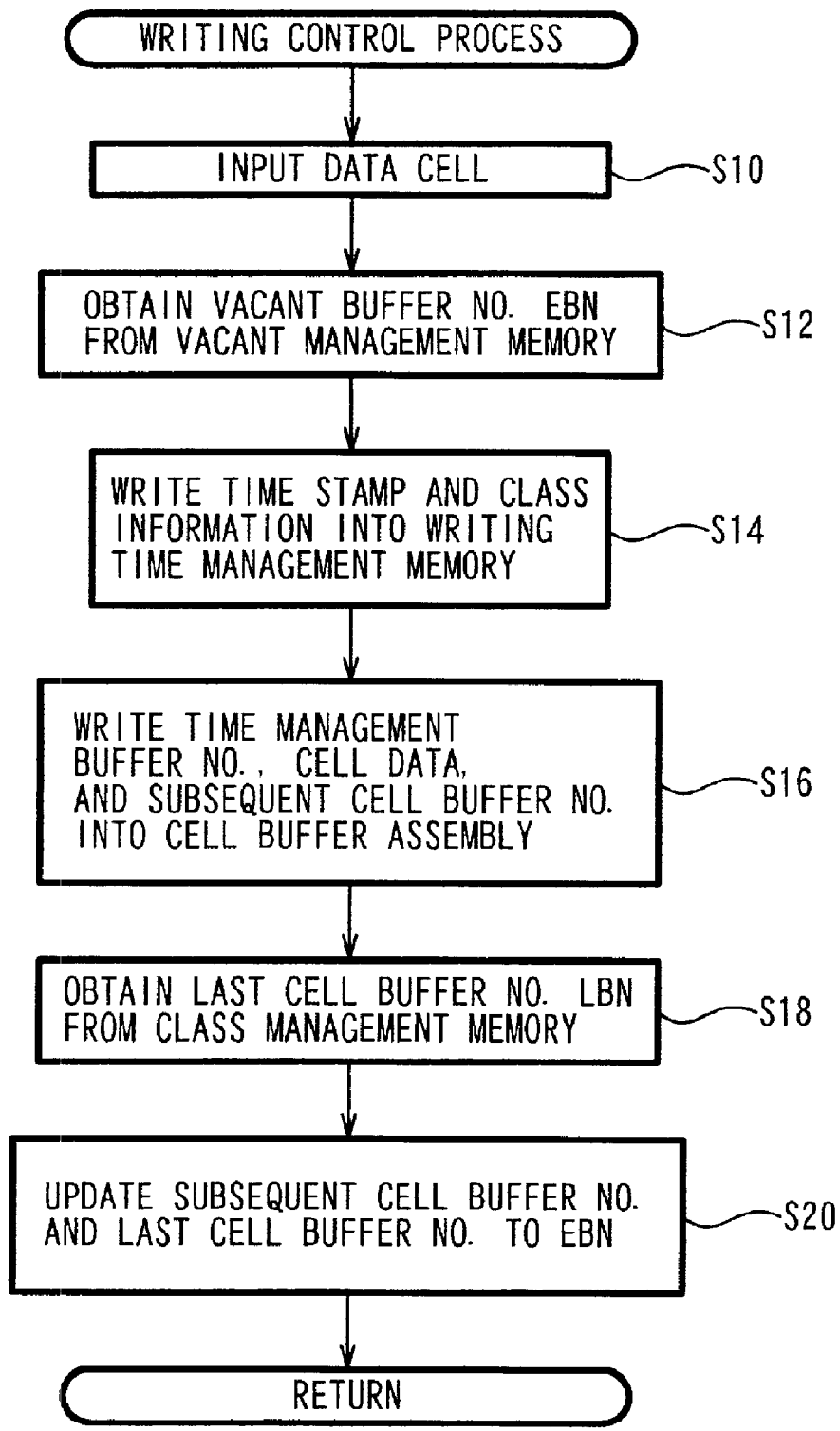
FIG. 7 is a flowchart showing a writing control process.
Figure 8:
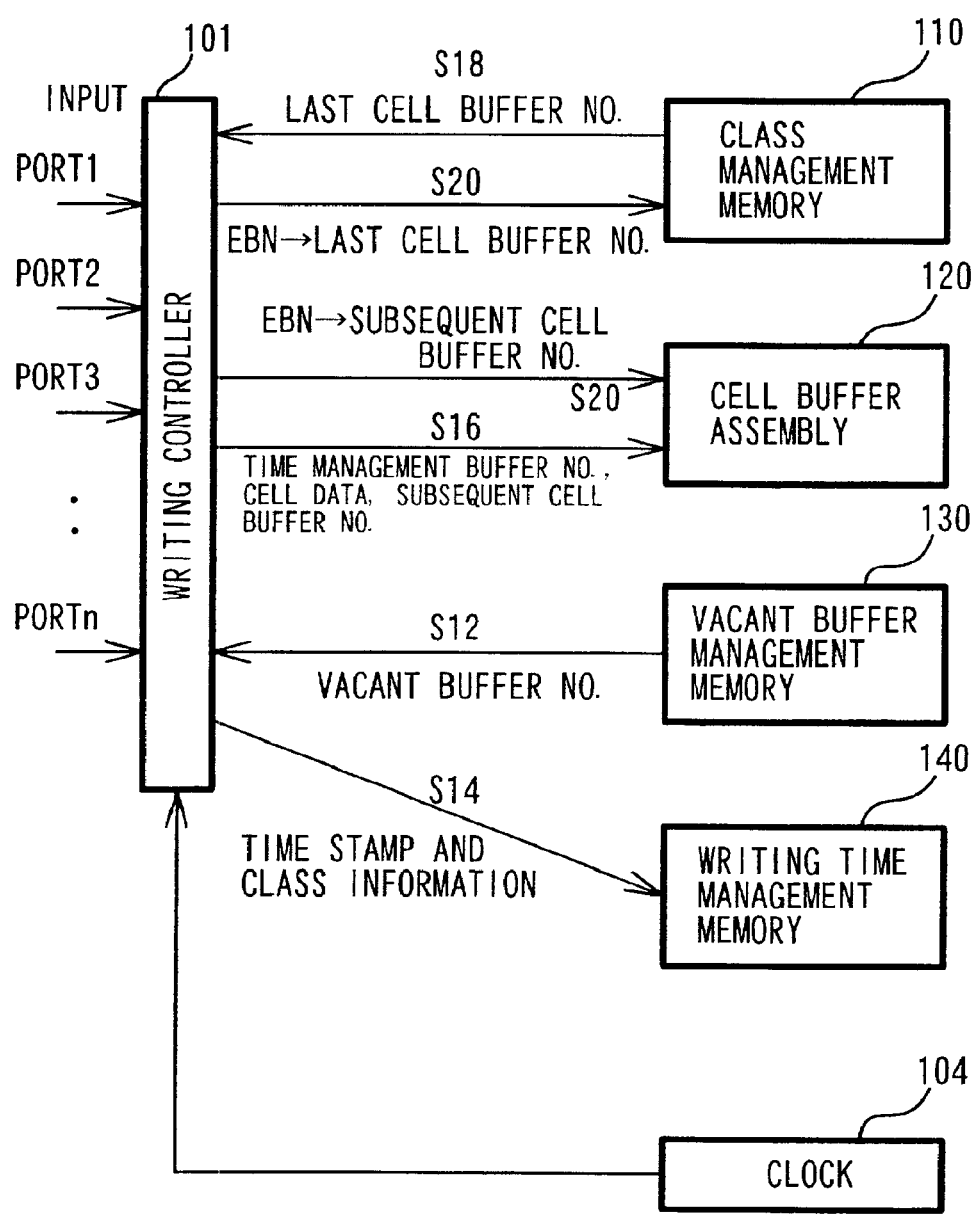
FIG. 8 shows accesses of the respective elements in the course of the writing control process.

FIG. 7 is a flowchart showing the writing control process. FIG. 8 shows accesses of the respective elements in the course of the writing control process. The details of the writing control process are described with referring to FIGS. 7 and 8. The writing controller 101 shown in FIG. 2 executes the writing control process.

The writing controller 101 first receives a data cell from an input port at step S10, and obtains a vacant buffer number EBN from the vacant buffer management memory 130 at step S12. The vacant buffer management memory 130 has the structure shown in FIG. 5, and the vacant buffer number EBN, which represents a vacant buffer selected among the first management buffer 130(1) to the m-th management buffer 130(m), is specified by a read pointer. As the vacant buffer number is obtained at step S12, the read pointer is incremented by one. Null data is input into the buffer that has just been specified as the vacant buffer by the read pointer.

The writing controller 101 then writes the time stamp and the class information in the writing time management memory 140 at step S14. The writing position is specified by a write pointer in the writing time management memory 140. For example, a cell input via the first input port is stored in the cell buffer assembly 120 and a value 'k' is set to the write pointer of the first time management buffer 140(1) (see FIG. 6), which is mapped to the first input port. In this example, the time stamp and the class information are written into the buffer [k] of the first time management buffer 140(1). The time stamp is input from the clock 104. Simultaneously with the process of writing the time stamp and the class information, the enable flag is set ON, that is, set equal to '1' to show that the data in the buffer [k] is valid. The write pointer is then incremented by one. The write pointer is returned to the initial value '1' when exceeding the value 'm'. This arrangement enables the time stamp to be sequentially stored into the buffers [1] to [m] of each time management buffer in the writing time management memory 140.

The writing controller 101 subsequently writes the time management buffer number, the cell data, and the subsequent cell buffer number into a cell buffer of the cell buffer assembly 120 at step S16. These data are stored in the cell buffer specified by the vacant buffer number EBN. The time management buffer number coincides with the buffer number assigned to the buffer in the writing time management memory 140, in which the time stamp is stored. In the above example, the value 'k' is set to the time management buffer number. The cell data represents input data via the input port. At the time of writing the cell into the cell buffer, a next cell buffer, in which a next cell is stored, has not yet been determined, so that the own buffer number EBN is temporarily written as the subsequent cell buffer number.

On completion of storage of the cell, the writing controller 101 obtains a last cell buffer number LBN from the class management memory 110 at step S18. In the course of processing the first input port, the data stored in the first class management buffer 110(1) is obtained. The last cell buffer number LBN identifies a previous buffer that stores therein a previous cell, which is immediately before the cell that has just been written into the cell buffer specified by the buffer number EBN at step S16. Namely the next cell immediately after the cell of the last cell buffer number LBN is the cell of the buffer number EBN. The writing controller 101 thus updates the subsequent cell buffer number in the cell buffer assembly 120 from the last cell buffer number LBN to the buffer number EBN at step S20. At this moment, the last cell is stored in the last cell buffer specified by the buffer number EBN, so that the last cell buffer number LBN in the class management memory 110 is updated to the buffer number EBN at step S20. This concludes the series of writing control process.

The above series of processing is adopted in a concrete example. FIG. 9 shows a variation in data of the respective buffers in the course of the writing control process. In this concrete example, a cell input via the first input port is stored in the cell buffer assembly. For convenience of explanation, the cell buffer assembly includes four cell buffers. The hatched areas in FIG. 9 represent areas in which either null data or invalid data is stored.

At the initial stage when the writing control process starts, cell data is present only in the first cell buffer. The value '1' is accordingly set to both the head cell buffer number and the last cell buffer number in the first class management buffer. The residual three cell buffers, the second to the fourth cell buffers, are vacant, and these buffer numbers are stored in the vacant buffer management memory. In this example, the vacant buffer numbers '3', '4', and '2' are respectively stored in the first management buffer, the second management buffer, and the third management buffer. The vacant buffer numbers may be stored in other orders. The buffer [1] of the first time management buffer stores therein a time stamp 'aa:aa' of the first cell buffer and the quality class information '1' corresponding to the first input port. Since the time stamp 'aa:aa' is stored in the buffer [1], the buffer number '1' assigned to the buffer [1] is stored as the time management buffer number in the first cell buffer.

In this initial state, the process starts writing the cell data input via the first input port. As shown in the column 'S14' in FIG. 9, the writing controller 101 obtains the vacant buffer number '3', in which the input cell is to be written, from the first management buffer of the vacant buffer management memory and sets null data to the first management buffer. The writing controller 101 then writes a time stamp 'bb:bb' and the quality class information '1' into the buffer [2] of the first time management buffer.

The writing controller 101 subsequently writes cell data 'BBB' into the cell buffer specified by the obtained vacant buffer number '3', that is, the third cell buffer (see the column 'S16' in FIG. 9). The writing controller 101 simultaneously writes the buffer number '2' assigned to the buffer [2] as the time management buffer number and temporarily stores the own buffer number '3' as the subsequent cell buffer number in the third cell buffer. The writing controller 101 then obtains the last cell buffer number '1' of the first class management buffer.

The writing controller 101 finally updates the subsequent cell buffer number in the first cell buffer from the last cell buffer number '1' to '3', while updating the last cell buffer number in the first class management buffer to '3' (see the column 'S20' in FIG. 9). The above series of processing is carried out iteratively to successively store cell data into the cell buffers.

B2. Reading Control Process

Figure 10:
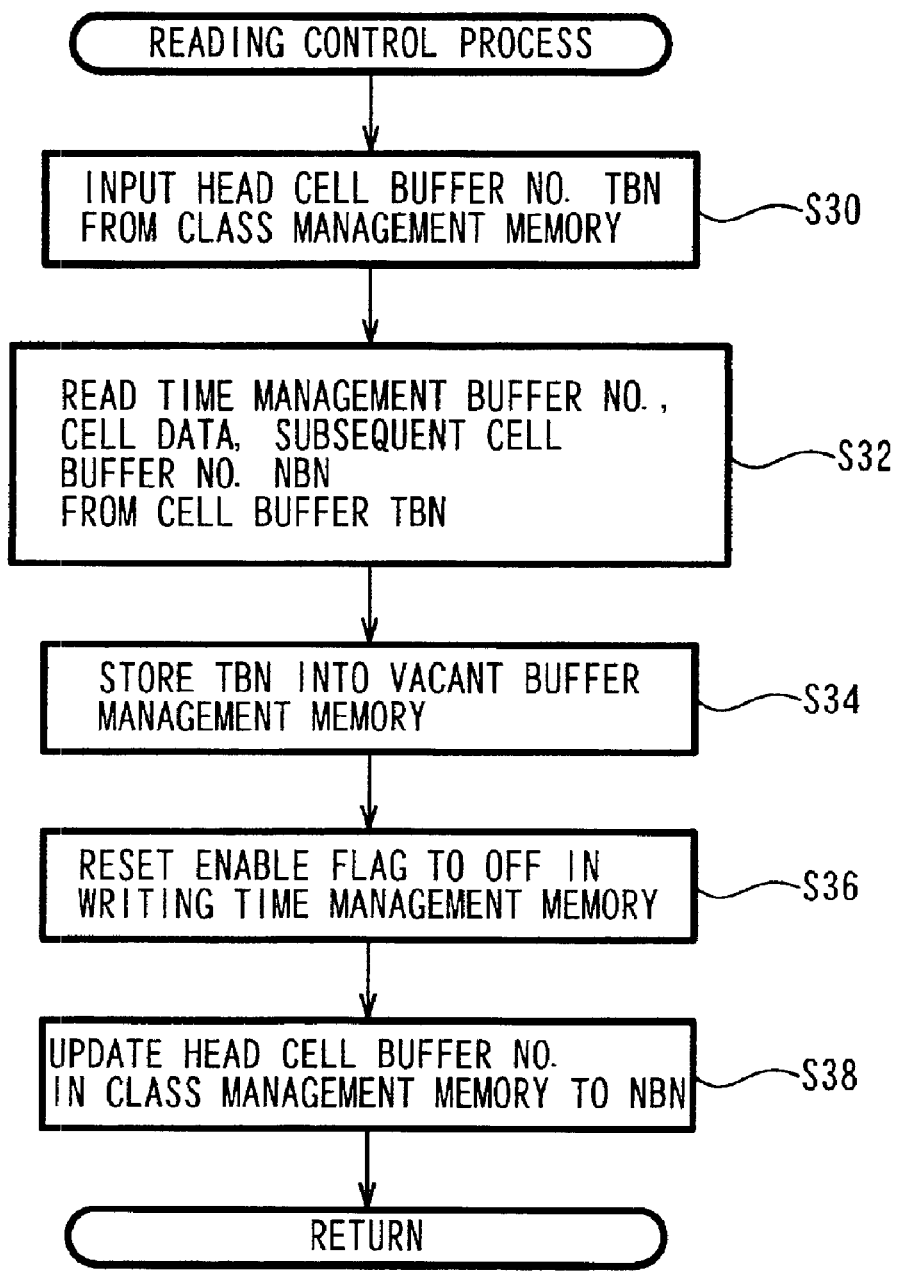
FIG. 10 is a flowchart showing a reading control process.
Figure 11:
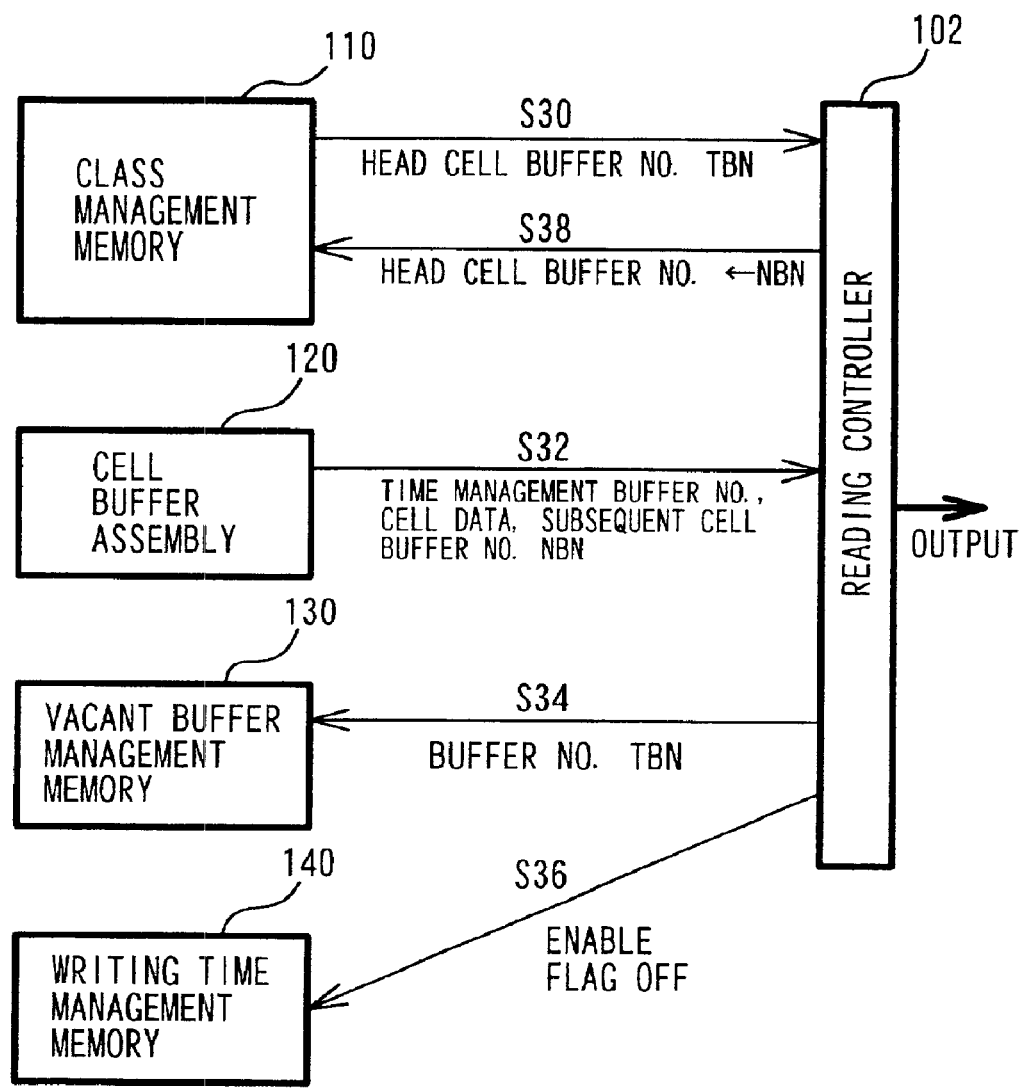
FIG. 11 shows accesses of the respective elements in the course of the reading control process.

FIG. 10 is a flowchart showing the reading control process. FIG. 11 shows accesses of the respective elements in the course of the reading control process. The details of the reading control process are described with referring to FIGS. 10 and 11. The reading controller 102 shown in FIG. 2 executes this reading control process.

The reading controller 102 first inputs a head cell buffer number TBN from the class management memory 110 at step S30. The reading controller 102 should read out a cell, while ensuring a preset communication rate at each input port. The reading controller 102 thus gains access to one of the first class management buffer 110(1) to the n-th class management buffer 110(n) in the class management memory 110 determined by the preset communication rate.

The reading controller 102 subsequently reads the time management buffer number, the cell data, and the subsequent cell buffer number NBN from the head cell buffer in the cell buffer assembly 120 specified by the input head cell buffer number TBN at step S32. The read-out cell data is output as part of the multiple signal to the ATM network. This step makes the cell buffer specified by the cell buffer number TBN vacant. The reading controller 102 accordingly stores the buffer number TBN into the vacant buffer management memory 130 at step S34. The area in which the buffer number TBN is to be stored is specified by a write pointer in the vacant buffer management memory 130. On completion of the storage into the vacant buffer management memory 130, the reading controller 102 increments the write pointer of the vacant buffer management memory 130 by one.

The reading controller 102 then gains access to the buffer in the writing time management memory 140 specified by the time management buffer number input at step S32 and resets the enable flag to zero or OFF at step S36. This invalidates the time stamp stored in this time management buffer.

Since the cell buffer specified by the head cell buffer number TBN has been read to be vacant, the cell buffer corresponding to the subsequent cell buffer number NBN becomes the head cell buffer at the corresponding input port. The reading controller 102 thus updates the head cell buffer number stored in the accessed class management buffer of the class management memory 110 to NBN at step S38. This concludes the series of reading control process.

The above series of processing is adopted in a concrete example. FIG. 12 shows a variation in data of the respective buffers in the course of the reading control process. In this concrete example, the process of reading out a cell starts in the initial state, which is identical with the final state shown in FIG. 9 (the state of the column 'S20').

The reading controller 102 first obtains a head cell buffer number '1' from the first class management buffer. The reading controller 102 then reads the cell data from the first cell buffer specified by the obtained head cell buffer number '1' and outputs the cell data to the ATM network (see the column 'S32' in FIG. 12). The existing data is kept in the first cell buffer until the first cell buffer is overwritten with new data. The data in the first cell buffer is, however, not usable after the reading operation and is accordingly expressed as invalid data in FIG. 12.

This reading operation makes the first cell buffer vacant. The reading controller 102 accordingly stores the cell buffer number '1' into the area in the vacant buffer management memory 130 specified by a write pointer. In this example, the cell buffer number '1' is stored into the fourth management buffer specified by the write pointer (see the column 'S34' in FIG. 12).

The time management buffer number read from the first cell buffer is '1'. The reading controller 102 thus resets the enable flag to '0' in the buffer [1] of the first time management buffer corresponding to the time management buffer number '1' (see the column 'S36' in FIG. 12). This operation invalidates the time stamp of the buffer [1].

The subsequent cell buffer number read from the first cell buffer is '3', so that the third cell buffer becomes the head cell buffer on completion of the reading process. The reading controller 102 accordingly updates the head cell buffer number in the first class management buffer to '3' (see the column 'S38' in FIG. 12). The above series of processing is carried out iteratively to successively read cell data from the cell buffers.

B3. Cell Discard Control Process

Figure 13:
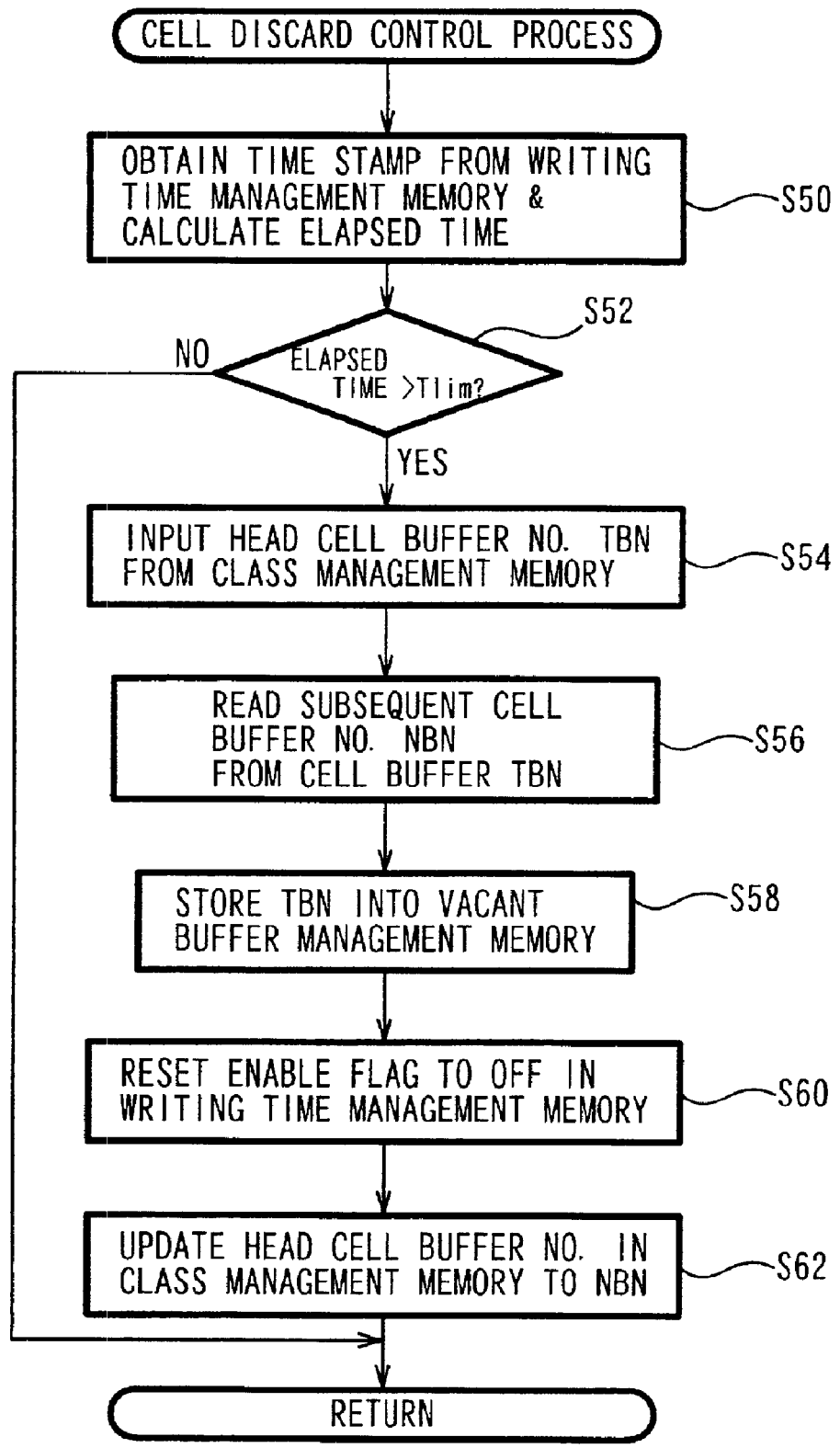
FIG. 13 is a flowchart showing a cell discard control process.
Figure 14:
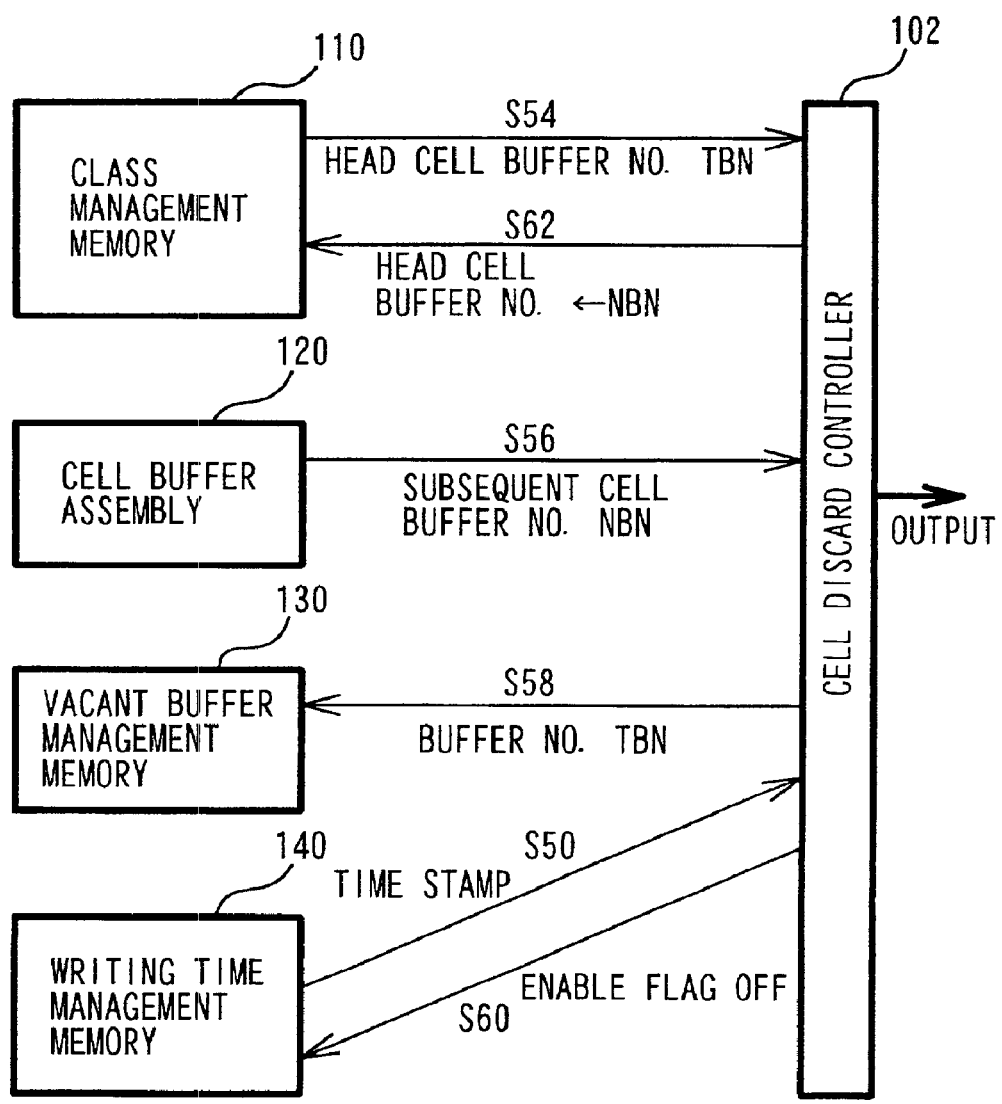
FIG. 14 shows accesses of the respective elements in the course of the cell discard control process.

FIG. 13 is a flowchart showing the cell discard control process. FIG. 14 shows accesses of the respective elements in the course of the cell discard control process. The details of the cell discard control process are described with referring to FIGS. 13 and 14. The cell discard controller 103 shown in FIG. 2 executes this cell discard control process.

The cell discard controller 103 obtains a time stamp from the writing time management memory 140 and calculates the difference between the current time and the obtained time stamp as an elapsed time after the writing at step S50. A large number of time stamps are stored in the writing time management memory 140. The cell discard controller 103 obtains the time stamp sequentially from the buffers having the enable flag set equal to '1'. The buffers are arranged in the order of the time stamp in each of the time management buffers of the writing time management memory 140. The calculation of the elapsed time may thus be performed only for the buffer having the oldest time stamp with regard to each of the first time management buffer 140(1) to the n-th time management buffer 140(n). The following description regards the processing for one buffer of interest.

The cell discard controller 103 compares the elapsed time calculated at step S50 with a preset threshold value Tlim at step S52. When the elapsed time is not greater than the threshold value Tlim, the cell discard controller 103 determines that the cell related to the buffer of interest has not yet been stored for a sufficiently long time. The cell discard controller 103 thus immediately exits from the cell discard control routine without any further processing.

When the elapsed time is greater than the threshold value Tlim, on the other hand, the cell discard controller 103 determines that the cell related to the buffer of interest has already been stored for the sufficiently long time, and discards the cell. Leaving the cell after the storage for the sufficiently long time raises the occupation rate of the buffer and fails to ensure the preset communication rate at each input port.

The threshold value Tlim represents the reference value to determine execution or non-execution of the cell discard operation. The threshold value Tlim is set for each quality class of communication. For example, frequent cell writing and cell reading operations are expected in the quality class having a high communication rate or a wide bandwidth. A relatively small value is accordingly set to the threshold value Tlim for this quality class. A relatively large value is set to the threshold value Tlim, on the other hand, for the quality class having a low communication rate or a narrow bandwidth. The threshold value Tlim depends upon not only the communication rate but other parameters, such as the allowable range of the error rate. The threshold value Tlim is set according to the structure of the communication controller 100 by taking into account both the minimum data hold time, which is necessary to satisfy the required communication specification for reach class, and the maximum data hold time, which is allowed in a specific range that does not interfere with communication of other quality classes. The class information is stored in the writing time management memory 140. The cell discard control process selectively uses the adequate threshold value Tlim corresponding to the quality class, based on the stored class information.

The subsequent series of cell discard control process is basically similar to the reading control process (see FIGS. 10 to 12). The cell discard controller 103 inputs the head cell buffer number TBN from the class management memory 110 at step S54. Unlike the reading control process, the data in the writing time management memory 140 determines which of the class management buffers in the class management memory 110 the cell discard controller 103 gains access to. For example, when the cell related to the time stamp stored in the first time management buffer 140(1) is to be discarded, the head cell buffer number TBN is obtained from the corresponding first class management buffer 110 (1).

The cell discard controller 103 reads the subsequent cell buffer number NBN from the head cell buffer in the cell buffer assembly 120 specified by the input head cell buffer number TBN at step S56. The time management buffer number and the cell data are not required and are thus not read out in the cell discard control process. This shortens the processing time, compared with the reading control process.

In the same manner as the reading control process, the cell discard controller 103 stores the buffer number TBN into the vacant buffer management memory 130 at step S58, resets the enable flag to OFF in the buffer of interest in the writing time management memory 140 at step S60, and updates the head cell buffer number stored in the accessed class management buffer of the class management memory 110 to the subsequent cell buffer number NBN at step S62. This concludes the series of cell discard control process.

FIG. 15 shows a variation in data of the respective buffers in the course of the cell discard control process. In this concrete example, the process of discarding a cell starts in the initial state, which is identical with the final state shown in FIG. 9 (the state of the column 'S20').

The cell discard controller 103 determines execution or non-execution of the cell discard operation, based on the time stamp 'aa:aa' read from the buffer [1] in the first time management buffer. When the cell discard operation is to be executed, the cell discard controller 103 obtains the head cell buffer number '1' from the first class management buffer, and obtains the subsequent cell buffer number '3' from the first cell buffer specified by the head cell buffer number '1' (see the column 'S56' in FIG. 15).

This cell discard operation makes the first cell buffer vacant. The cell discard controller 103 accordingly stores the cell buffer number '1' into the area in the vacant buffer management memory 130 specified by a write pointer. In this example, the cell buffer number '1' is stored into the fourth management buffer specified by the write pointer (see the column 'S58' in FIG. 15).

The cell discard controller 103 then resets the enable flag to '0' in the buffer [1], in which the time stamp of interest has been stored (see the column 'S60' in FIG. 15). This operation invalidates the time stamp of the buffer [1].

The subsequent cell buffer number read from the first cell buffer is '3', so that the third cell buffer becomes the head cell buffer on completion of the cell discard process. The cell discard controller 103 accordingly updates the head cell buffer number in the first class management buffer to '3' (see the column 'S62' in FIG. 15). This concludes discard of the cell, which has been stored for a long time period exceeding the preset threshold value Tlim. Although the data are still present in the first cell buffer on completion of the processing at step S62, this cell discard process invalidates the data in the cell buffer, which is expressed by hatching.

B4. Modification of Cell Discard Control Process

The procedure of the above embodiment discards a cell, on the premise that cells are input at each input port in time series. For example, it is assumed that cells A, B, and C, which are included in a series of signals in this order, are input while keeping this order. Namely the cells are not input in any different order, for example, in the order of B, A, C. On such assumption, the head cell input first is the target of the cell discard control, which is executed when the elapsed time exceeds the preset threshold value Tlim.

Figure 16:
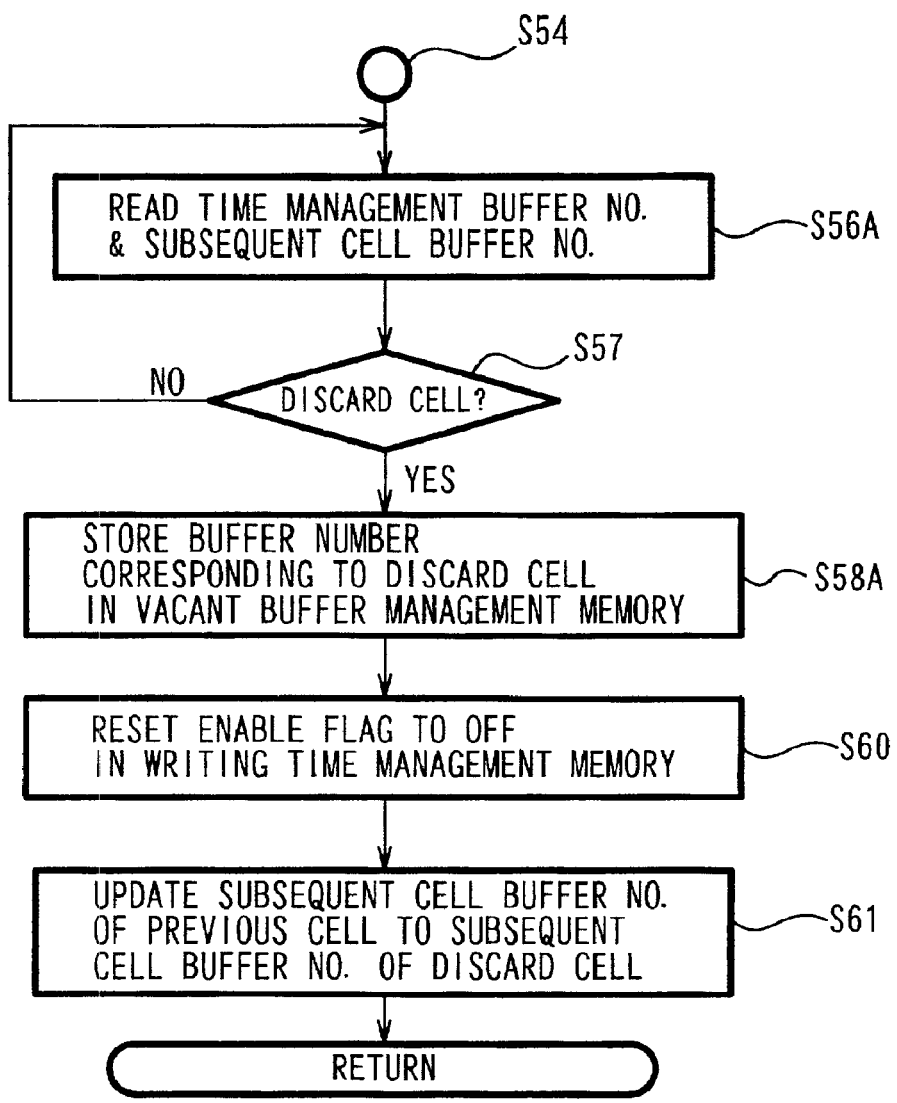
FIG. 16 is a flowchart showing modification of the cell discard control process.

The cell discard control in the case of cell input in non-time series is readily attained by modifying the routine of FIG. 13. FIG. 16 is a flowchart showing modification of the cell discard control process. Only the different part from the cell discard control process of FIG. 13 is shown in FIG. 16.

When the cell discard operation is to be executed, the cell discard controller 103 reads the time management buffer number and the subsequent cell buffer number from the cell buffer specified by the head cell buffer number TBN at step S56A. The cell data is not read out here. The cell discard controller 103 then determines whether or not the cell buffer of interest specified by the head cell buffer number TBN and read at step S56A stores a discard cell or a target of the cell discard operation at step S57. The decision is based on the result of comparison between the time management buffer number read from the cell buffer of interest and the buffer number allocated to the buffer in the writing time management memory 140, in which the time stamp exceeding the preset threshold value Tlim is stored. In the case of coincidence of these two buffer numbers, the cell kept in the cell buffer of interest is determined as the discard cell. In the case of incoincidence, on the other hand, the cell discard controller 103 reads the data from the cell buffer specified by the subsequent cell buffer number and carries out the decision discussed above. The iterative cycle of steps S56A and S57 specifies the buffer number corresponding to the discard cell. This also specifies the buffer numbers corresponding to a previous cell and a next cell immediately before and after the discard cell.

After specification of the discard cell, the cell discard controller 103 stores the buffer number corresponding to the specified discard cell in the vacant buffer management memory 130 at step S58A and resets the enable flag to OFF in the buffer of interest in the writing time management memory 140 at step S60.

At this moment, the cell buffer of the previous cell stores the buffer number corresponding to the discard cell as the subsequent cell buffer number. The management information should be updated to read the next cell subsequent to the previous cell after discard of the specified discard cell. The cell discard controller 103 accordingly stores the subsequent cell buffer number, which has been kept in the cell buffer of the discard cell, as the subsequent cell buffer number in the cell buffer of the previous cell at step S61.

Figure 17:
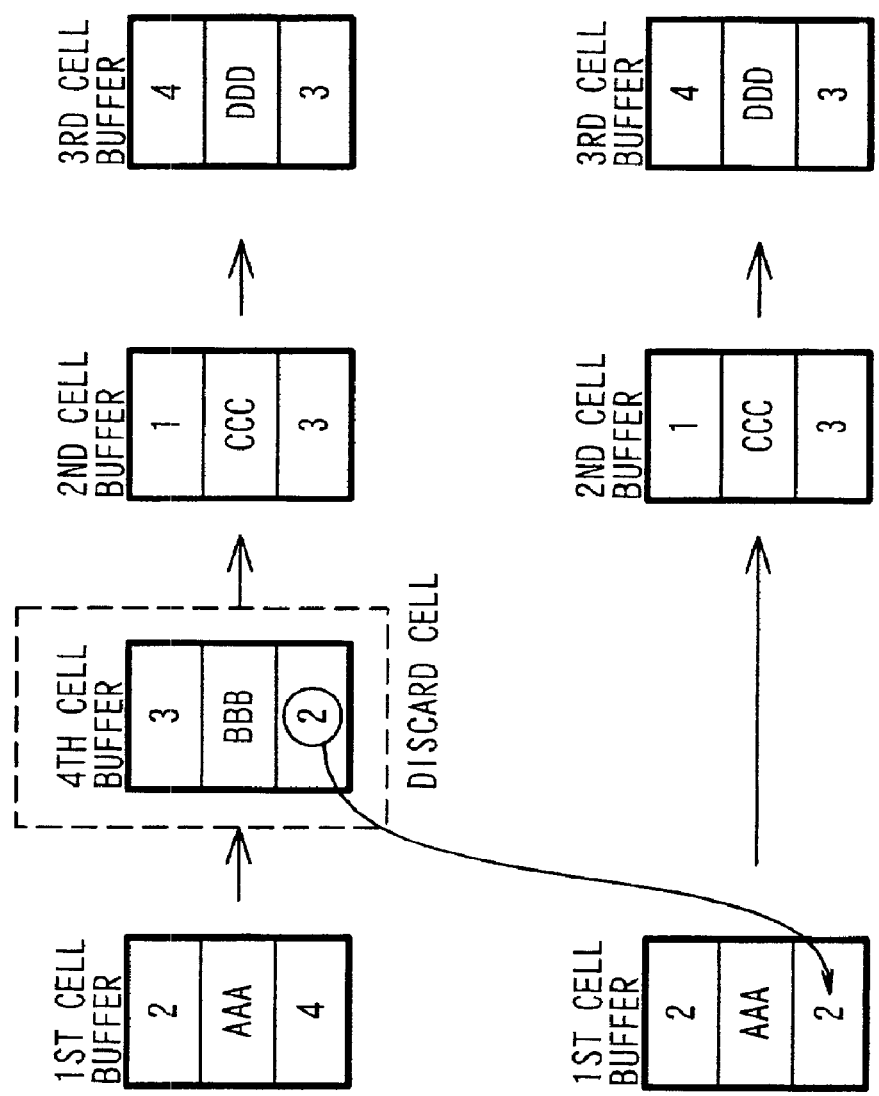
FIG. 17 shows a variation in data of cell buffers in the course of the modified cell discard control process.

The above series of processing is adopted in a concrete example. FIG. 17 shows a variation in data of the cell buffers in the course of the modified cell discard control process. For convenience of explanation, it is assumed that the cell buffer assembly 120 is divided into four areas, first to fourth cell buffers. Data from the top to the bottom in each cell buffer represent the time management buffer number, the cell data, and the subsequent cell buffer number.

The upper row shows the state prior to the cell discard operation. Head cell data 'AAA' is stored in the first cell buffer. Since the subsequent cell buffer number stored in the first cell buffer is '4', the next cell is present in the fourth cell buffer. Subsequent cells are stored in the order of the second cell and the third cell.

The time stamp of the discard cell is stored in the buffer [3] of the writing time management memory 140. The iterative cycle of steps S56A and S57 in the flowchart of FIG. 16 specifies the fourth cell buffer, in which the time management buffer number '3' is stored, as the cell buffer of the discard cell.

The cell discard controller 103 discards the cell from the fourth cell buffer and stores the subsequent cell buffer number '2', which has been kept in the fourth cell buffer, into the first cell buffer of the previous cell. This updates the subsequent cell buffer number to '2' in the first cell buffer. The lower row of FIG. 17 shows the state after the cell discard operation. After the cell discard operation, the first cell buffer, the second cell buffer, and the third cell buffer are read in this order.

In the communication controller 100 of this embodiment discussed above, the cell discard controller 103 discards the cell by the series of processing, which is independent of the processing by the writing controller 101 and the reading controller 102. This arrangement desirably simplifies the writing control process and the reading control process, while flexibly adjusting the execution timing of the cell discard control process. The procedure of the above embodiment sequentially carries out the writing control process, the reading control process, and the cell discard control process at the same rate of execution. The rate of execution of the cell discard control process may, however, be different from the rate of execution of the other control processes. The rate of execution of the cell discard control process may be varied according to the occupation rate of the cell buffer assembly 120.

The procedure of this embodiment discards the cell without reading the cell data. Discard of the cell is implemented by rewriting the management information stored in the vacant buffer management memory 130, the class management memory 110, and the writing time management memory 140. This arrangement simplifies the cell discard control and enhances its efficiency.

The above embodiment and its modifications are to be considered in all aspects as illustrative and not restrictive. There may be many modifications, changes, and alterations without departing from the scope or spirit of the main characteristics of the present invention. For example, the control processes discussed above may be actualized by the hardware, instead of the software.

The scope and spirit of the present invention are indicated by the appended claims, rather than by the foregoing description.

What is claimed is:

1. A communication control system that controls multiplex communication in the form of fixed-length cells, said communication control system comprising:

a common cell buffer assembly that stores therein cells of the multiplex communication; and a buffer management unit that controls a process of reading a cell from said cell buffer assembly and a process of writing a cell into said cell buffer assembly, thus controlling communication between a large number of input-output ports and a multiplex communication network, wherein said buffer management unit comprises:

a cell discard controller that discards a cell stored in said cell buffer assembly when a time period of not shorter than a preset discard reference time has elapsed since storage of the cell into said cell buffer assembly; and a writing time management unit that maps each cell to a writing time of the cell and manages the mapping, and said cell discard controller discards a cell, based on an elapsed time since the writing time of the cell.

2. A communication control system in accordance with claim 1, wherein said writing time management unit comprises:

a writing time buffer that stores a writing time of each cell in time series; and a related information storage unit that stores related information, which relates data stored in said cell buffer assembly to data stored in said writing time buffer.

3. A communication control system in accordance with claim 1, wherein the multiplex communication includes a plurality of different quality classes of communication, the discard reference time is set for each quality class, and said buffer management unit controls the communication according to the quality class.

4. A communication control system in accordance with claim 1, wherein said buffer management unit comprises:

a vacant buffer management unit that manages vacant areas in said cell buffer assembly;

a cell management unit that stores management information to manage places of storage of a series of cells, which constitute each communication;

a writing controller that writes a new cell in a vacant area specified by said vacant buffer management unit and transmits a result of the writing to said cell management unit; and a reading controller that reads a cell from said cell buffer assembly, based on the management information in said cell management unit and transmits a result of the reading to said vacant buffer management unit.

5. A communication control system in accordance with claim 4, wherein said cell discard controller deletes information on a place of storage of the cell to be discarded from said cell management unit, and transmits the place of storage as a new vacant area to said vacant buffer management unit, thereby implementing discard of the cell.

* * * * *